(12) United States Patent
Boucherie (10) Patent No.: US 9,050,742 B2
(45) Date of Patent: Jun. 9, 2015

(54) INJECTION MOULDING APPARATUS

(71) Applicant: GB Boucherie NV, Izegem (BE)

(72) Inventor: Bart Gerard Boucherie, Izegem (BE)

(73) Assignee: GB BOUCHERIE NV (BE)

( * ) Notice: Subject to any disclaimer, the term of this patent is extended or adjusted under 35 U.S.C. 154(b) by 0 days.

(21) Appl. No.: 14/263,837

(22) Filed: Apr. 28, 2014

(65) Prior Publication Data

US 2014/0322377 A1    Oct. 30, 2014

(30) Foreign Application Priority Data

Apr. 26, 2013  (BE) .................................. 2013/0298

(51) Int. Cl.
| | |
|---|---|
| *B29C 45/06* | (2006.01) |
| *B29C 45/04* | (2006.01) |
| *B29C 45/16* | (2006.01) |
| *B29C 45/14* | (2006.01) |
| *B29C 45/76* | (2006.01) |
| *B29L 31/42* | (2006.01) |

(Continued)

(52) U.S. Cl.
CPC ........... *B29C 45/045* (2013.01); *B29L 2031/42* (2013.01); *B29C 45/162* (2013.01); *B29C 45/1628* (2013.01); *B29C 45/0433* (2013.01); *B29C 2045/1792* (2013.01); *B29C 2045/2751* (2013.01); *B29C 2945/76993* (2013.01); *B29C 45/14385* (2013.01); *B29C 45/762* (2013.01)

(58) Field of Classification Search
CPC .. B29C 45/045; B29C 45/162; B29C 45/762; B29C 45/1628; B29C 45/14385; B29C 2045/1792; B29C 2045/2751; B29C 2945/76993; B29L 2031/42
See application file for complete search history.

(56) References Cited

U.S. PATENT DOCUMENTS

RE28,600 E  * 11/1975 Lemelson ..................... 72/265
4,950,144 A  * 8/1990 Watanabe et al. ............ 425/135
(Continued)

FOREIGN PATENT DOCUMENTS

| DE | 1087951 | 8/1960 | |
|---|---|---|---|
| DE | 102 08 599 | 8/2003 | ............. B29C 45/16 |

(Continued)

OTHER PUBLICATIONS

Belgium Search Report (no translation) issued in corresponding application No. 2013/0298, dated Feb. 10, 2014 (12 pgs).

(Continued)

*Primary Examiner* — Yogendra Gupta
*Assistant Examiner* — Emmanuel S Luk
(74) *Attorney, Agent, or Firm* — Hayes Soloway P.C.

(57) ABSTRACT

An injection molding apparatus for injection molding articles from plastic, has a guide that extends along a plurality of stations, including at least one injection molding station, and along the guide at least one slide can be driven successively through the stations, wherein the or each slide transports the article to be produced from station to station. The slide or the plurality of slides altogether have associated therewith a plurality of motors which are seated on the slide or the slides. The motors have associated and moved therewith lines for supplying electrical power and/or at least one line for signalling, which are coupled with a stationary electrical power source or a stationary controller, respectively. At least one of the lines is guided from one motor to another. The motors are coupled with the at least one line in respect of the transfer of electrical power and/or signals.

22 Claims, 4 Drawing Sheets

(51) Int. Cl.
   *B29C 45/17* (2006.01)
   *B29C 45/27* (2006.01)

(56) References Cited

U.S. PATENT DOCUMENTS

| | | | |
|---|---|---|---|
| 4,970,447 A * | 11/1990 | Kamiguchi et al. | 318/567 |
| 5,023,028 A * | 6/1991 | Kamiguchi et al. | 264/40.1 |
| 5,251,143 A * | 10/1993 | Maeda | 700/176 |
| 5,279,778 A * | 1/1994 | Taira et al. | 264/40.1 |
| 5,342,559 A * | 8/1994 | Kamiguchi et al. | 264/40.1 |
| 5,853,775 A * | 12/1998 | Oas et al. | 425/145 |
| 5,911,924 A * | 6/1999 | Siegrist et al. | 264/40.1 |
| 6,294,122 B1 * | 9/2001 | Moss et al. | 264/328.9 |
| 6,328,551 B1 * | 12/2001 | Takatsugi et al. | 425/145 |
| 6,409,495 B1 * | 6/2002 | Kamiguchi et al. | 425/150 |
| 6,527,534 B1 * | 3/2003 | Kamiguchi et al. | 425/139 |
| 6,747,430 B2 * | 6/2004 | Oka | 318/560 |
| 7,462,025 B2 * | 12/2008 | Uchiyama et al. | 425/143 |
| 7,744,787 B2 * | 6/2010 | Kato et al. | 264/40.1 |
| 7,798,799 B2 * | 9/2010 | Shiozawa et al. | 425/149 |
| 7,914,716 B2 * | 3/2011 | Shiozawa et al. | 264/40.1 |
| 2002/0015749 A1 * | 2/2002 | Kamiguchi et al. | 425/139 |
| 2002/0056933 A1 * | 5/2002 | Kamiguchi et al. | 264/40.1 |
| 2003/0042640 A1 * | 3/2003 | Kubota | 264/40.1 |
| 2005/0214407 A1 * | 9/2005 | Watanabe et al. | 425/595 |
| 2005/0244537 A1 * | 11/2005 | Uchiyama et al. | 425/593 |
| 2005/0285289 A1 * | 12/2005 | Uchiyama et al. | 264/40.1 |
| 2006/0216370 A1 * | 9/2006 | Uchiyama et al. | 425/150 |
| 2009/0142435 A1 * | 6/2009 | Sakakibara et al. | 425/130 |
| 2010/0127430 A1 * | 5/2010 | Singh | 264/338 |
| 2011/0291328 A1 * | 12/2011 | Vasapoli et al. | 264/328.1 |
| 2014/0300019 A1 * | 10/2014 | Moss et al. | 264/40.7 |

FOREIGN PATENT DOCUMENTS

| | | | | |
|---|---|---|---|---|
| DE | 20 2006 017 919 | | 3/2008 | A46D 3/00 |
| EP | 0993913 | | 4/2000 | B25J 19/00 |
| EP | 2324980 | | 5/2011 | B29C 45/16 |
| WO | WO2012130469 | | 10/2012 | B29L 31/42 |

OTHER PUBLICATIONS

Vandemaele et al., "New Concept for Multi-Component Moulding High Output—Maximal Layout Flexibility—Minimal Size," from http://www.boucherie.com (1 pg).

* cited by examiner

INJECTION MOULDING APPARATUS

FIELD OF THE INVENTION

The invention relates to an injection moulding machine for injection moulding articles from plastics, in particular for injection moulding brush bodies to be stuffed with bristles.

BACKGROUND

Apparatus for injection moulding plastic articles of different kinds, mainly (but not exclusively) everyday objects such as toothbrush bodies, writing utensils, handle parts, medical components or other plastic components of any kind, which are injection-moulded from a plurality of plastic components due to functional or design requirements, comprise a plurality of injection moulding stations.

Such apparatus generally have a mould block that is stationary on the nozzle side, on which mould block one, or a group of, sub-cavity/sub-cavities is/are formed for each component to be injection-moulded, a mould block that is movable on the ejection side, on which one, or corresponding groups of, sub-cavity/sub-cavities is/are formed, which in the case of a closed injection moulding apparatus form, together with the sub-cavities of the stationary mould block, cavities for injection moulding the articles, and an ejection station which is located outside of the mould blocks.

Between the groups of cavities and the ejection station, the moulded parts are transported by means of a mould block or a section of the mould block, namely a holder. The holders form, e.g. in the case of toothbrush bodies, so-called head inserts, which are inserted in recesses of the mould block on the ejection side and form sub-areas of the sub-cavities, which correspond to the head area of a toothbrush body. Tools of this kind are shown for example in DP 102 08 599 A1 or in DE 20 2006 017 919 U1. These holders are positioned by a drive mechanism having predetermined linear or rotary index steps from the first group of cavities to the next up to the ejection station and back again to the first group of cavities.

During the production of brushes, for example toothbrushes, household brushes or paintbrushes, it is customary to guide a brush body successively to various processing stations, including injection moulding stations, on each of which one specific processing step, amongst others at least one injection moulding step, is carried out. For example, the basic form of the brush body is injection-moulded in one injection moulding station, in a subsequent station a second component of a different colour and/or a different hardness is moulded onto it. In further stations, further components are moulded on top of it, or a small brush plate that has already been stuffed with bristles is overmoulded in order to produce the entire brush body with head, neck and handle. Yet further stations are feed or ejection stations.

In order to shift the already partially injection-moulded brush body by means of the holder and/or the complete mould block itself, one or more slides are used which circulate along a specified path, i.e. a specified guide, in such a way that they (possibly with the partially or completely injection-moulded articles) are presented one after the other to the various stations for processing. In a simple example, the injection moulding apparatus includes a loading station, one, however preferably a plurality of injection moulding stations, and an unloading station. After that, for example three or four slides may be used which are each indexed by one station at every cycle of the injection moulding apparatus.

On the or each slide, respectively one or several motors is/are attached, which generate individual movements. For example, there are injection moulding devices, in which each slide has its own motor provided for driving the slide along the guide. Moreover or alternatively, one or more motors may be provided on the slide, by means of which e.g. the holders for the partially or completely injection-moulded articles are shifted. The electrical power supply to the motors and the control to the motors is carried out via separate lines, namely via electrical power supply lines and signal lines. These lines lead to a stationary contact point, mostly to sliding contacts, in order to realise the transition from the movable to the stationary part. To ensure that the motors can be operated independently from each other, each motor has its own set of sliding contacts, which ensures the transition from the stationary line section to the moved line section.

It is the object of the invention to provide an injection moulding apparatus that is designed in a more cost-effective manner and requires less maintenance.

SUMMARY

The invention provides an injection moulding machine for injection moulding articles from plastics, in particular for injection moulding brush bodies to be stuffed with bristles, comprising a guide that extends along a plurality of stations, including at least one injection moulding station, and along said guide at least one slide can be driven successively through the stations, wherein the or each slide transports the article to be produced from station to station, and in particular each slide has at least one section of a mould block that is combined in the injection moulding station with an associated mould block for forming a cavity to be injection-filled with plastics, wherein the slide or the plurality of slides altogether have associated therewith a plurality of motors which are seated on the slide or the slides. The motors have associated and moved therewith lines for supplying electrical power and/or at least one line for signalling, which are coupled to a stationary electrical power source or a stationary controller, respectively, in that at least one of the lines is guided from one motor to another, and that the motors are coupled with the at least one line in respect of the transfer of electrical power and/or signals.

In the invention, a plurality of motors uses common sliding contacts because they are connected to the same line that is moved with the or each slide, so that the number of sliding contacts is reduced.

Whilst in the prior art a separate connection for each motor up to the electrical power source or controller is always provided, in order to supply each slide directly from the electrical power source and/or from the controller, the invention takes the opposite approach.

By coupling motors to a type of line that is moved for a common electrical power supply and/or signal supply, the number of contact points (normally sliding contacts) can be reduced to a minimum. Thus, a large number of expensive, high-maintenance contact points is avoided. A plurality of motors thus shares the same sliding contact with regard to electrical power supply and/or signal supply. According to the invention it is possible for a plurality of motors on a slide to be coupled to the same electrical power supply and/or signal line or lines or for motors from various slides, if a plurality of slides is provided, to be coupled to the electrical power supply and/or signal lines, but combined forms are also possible. These lines are not stationary, but are moved therewith by the moving slides.

The term "at least a section of a mould block" may comprise various embodiment variants. The following variants are not to be understood to be exhaustive. On the one hand, the entire mould block can be driven together with or on the slide. Moreover, the mould block may have several sections, with a section that has a portion of the sub-cavity being moved by the slide. A further possibility consists in providing on the slide a core that protrudes into the cavity, which core contributes towards determining the shape of the cavity, i.e. the cavity to be injection-filled. This core, which also constitutes a portion of the mould block, may be attached to the slide either in a detachable or a non-detachable manner or it may be part of the article to be produced. An example for the latter case: when moulding on a plastic handle to a screwdriver, the metal bar of the screwdriver will then be a core that is fastened to the slide and that protrudes into the cavity. After the injection process, the plastic handle and the metal rod will then be permanently connected to each other, and the article will be removed together with the slide.

Of course, the article to be produced by the or each slide will not initially be the finished article, but may under certain circumstances just be a primary or intermediate product.

The lines for electrical power supply and/or the at least one line for signalling may be guided from one slide to another without sliding contacts therebetween so that motors of these slides are coupled with at least one line moved therewith (i.e. moved together with the associated slide) for transfer of electrical power and/or signals.

One embodiment of the invention provides for one or several motors each seated on several slides which are driven. Electrical power supply and/or signal lines extend directly from one slide to another, without being coupled in between to the electrical power source or to the controller. At least some of the motors of these slides are coupled to these electrical power supply and/or signal lines in respect of the transfer of electrical power and/or signals. The electrical power supply and/or signal lines thus form a type of ring line which extends over several slides and to which the motors of several slides are coupled.

However, a closed ring line does not have to be provided, rather it is generally also possible to use electrical power supply and/or signal lines which, so to speak, lead to the last motor that is supplied by these lines. This applies first of all to signal lines. It is alternatively provided here that a so-called open bus system is used, for example a CAN bus, wherein at least one signal line that is designed as a supply line for signals, extends via the contact point to one or several slides. Via this line, a plurality of motors receives their signals, without a second signal line being necessary. This reduces the number of required sliding contacts even further.

The lines for supplying electrical power (hereinafter also referred to as "electrical power supply line") and/or the at least one line for signalling (hereinafter also referred to as "signal line") may extend along all of the slides, and preferably both in respect of supplying electrical power and signals. This means again that altogether only one associated contact point for the continuous signal line and the continuous electrical power supply line is required, i.e. for example respectively two sliding contacts (one contact each for the beginning and the end of each line) each are provided. If an open bus system is used, one sliding contact is sufficient for the line supply, i.e. the transition from the control to the moving part.

Not only all of the slides have to be connected to the same electrical power supply and/or signal lines in respect of the transfer of electrical power and/or signals, but also all of the motors of all of the slides. Of course, it would be expedient in particular for electrical power supply under certain circumstances to provide, in the case of a large number of motors, two or more electrical power supply lines, for example in order to divide the motors into two or three groups.

Further, each slide may carry one motor for moving the slide along the path.

Each slide has at least one motor for shifting the mould block relative to the slide itself, in order to shift the brush body in at least one injection moulding station.

These mentioned motors for shifting or moving may be coupled in respect of the transfer of electrical power and/or signals to the same electrical power supply lines and/or the same signal line(s). However, it is also possible to couple for example only the motors for movement along the guide or only the motors for moving the brush bodies during processing together to their own electrical power supply and/or signal line in respect of the transfer of electrical power and/or signals or, as mentioned above, to form groups.

DC or AC motors may be used as motors. In particular, at least some motors, preferably all motors are servomotors.

One embodiment of the invention provides AC servomotors with an integrated controller.

The guide extends preferably in a closed loop, but a circular path is not absolutely necessary here.

The injection moulding apparatus has for example a central guide block, about which the guide extends and from which the electrical power and signal coupling of the movable lines to a central electrical power source or control starts.

Only a central electrical power source and/or a central control can be provided for all motors.

As has already been mentioned, the moved electrical power supply lines and/or the at least one signal line may start from a stationary, central contact point.

All electrical power supply lines and all signal lines may start from a contact point.

This contact point has for example sliding contacts for a transition from stationary contacts to movable contacts.

A contact point usually consists of a set of sliding contacts for the electrical power supply lines and/or a set of sliding contacts for the signal line or lines. This set of sliding contacts respectively comprises at least two single sliding contacts for, as it were, the beginning and the and of the electrical power supply line or at least one sliding contact (if only one signal line is provided that does not pass through) for the signal line.

A so-called hybrid cable may lead to the individual motors or forms the movable ring line.

The stationary contact point can be positioned in the centre of the loop-shaped guide, i.e. in the centre of the area surrounded by the guide, so that its distance to all of the slides while circulating is as small as possible.

The electrical power supply and/or signal lines extend in a star-shaped manner from the centre of the loop-shaped guide to the individual slides.

The electrical power supply lines and/or the at least one signal line extending between the slides directly coupled to each other, i.e. the connection lines between slides that follow each other immediately with respect to a circuit, preferably extend from one slide first to the centre and from there to the subsequent slide. In cases where the slides are moved very independently from each other, the distance of the slides during circulation will be very different. This causes problems to arise in connection with guiding the lines, because the lines have to be sufficiently long in order to compensate for the longest distance and have to be guided to a sufficient degree in order to have a defined position at the smallest distance of the slide. Moreover, it is very disadvantageous for the life cycle of lines if they are permanently bent backwards and forwards. The extension of the lines towards the centre in a star-shaped manner ensures that the lines have sections which run in a V-shaped manner, and in this case the centre of the "V" would also constitute the centre of the loop-shaped guide. In the case of a different distance of the slides, the angle of the "V" would merely be slightly smaller or larger, which only causes a minor strain on the lines themselves. Moreover, the shortest distance of the slides from the centre will mostly vary less than the distance of adjacent slides from each other, which makes the star-shaped arrangement advantageous. The "V" can also be formed by having plug-in contacts at the centre, to which the connection line sections to the individual slides are detachably coupled. The plug-in contacts also form line sections, because they couple the one plug-in contact with another plug-in contact for a connection line section that leads to another slide.

It is not absolutely necessary for the immediately successive slides to be also connected to the same line in immediate succession. It would also be possible to connect together for example the first, after that the third, after that the second and subsequently the fourth slide. However, one embodiment of the invention provides for the electrical power supply lines and/or the one or more signal lines that run to the slides to start from a guide to the centre and from there to the immediately subsequent slide and then to the following slides.

The guide is preferably formed as a closed loop, but it may deviate from a circular form.

The lines can be guided in so-called cable carrier chains, which e.g. are for example available from the company Kabelschlepp®. This ensures that a defined guide for the lines is provided and that these are not bent beyond a minimum radius, no matter what the position of the slides is.

All of the motors can be programmed independently from each other. Thus, the portions of the mould block or of the mould blocks can be shifted as desired relative to the injection moulding stations. Any stops may at least partially be avoided. Further, the free shiftability means that the slides will not be driven at the same time into or out of an injection moulding station and/or the brackets on the slides will not have to be moved at the same time. Due to the complete independence of the movements it is possible to design the individual movements for the individual processing purpose in an optimised manner. However, this also means that for example one slide may move out of a station whereas the other slide is still standing in another injection moulding station. This also may help to reduce cycle times if the various injection moulding stations have different clock cycles. Further, any desired position and number of stations may be provided and changed on subsections of the guide, for example an ejection station, a loading station and a pre-positioning prior to the first injection station.

The controller comprises a bus system that can be used to specifically control the individual motors. This means that the controller is designed in such a way that it outputs specific control data sets for motors, which are received by the motors as being associated with them. Any non-associated control data sets are looped through as it were "unregarded". As a bus system, an open (e.g. CAN bus system) or a closed bus system may be used.

At least some of the servomotors may have an integrated controller, also referred to as a driver. Such drivers are directly attached to the motors or in immediate proximity thereto and are preferably coupled with encoders attached to the motors. The drivers receive appropriate information from the central controller via the bus system and can then directly control the motor and modify the electrical power supply thereof. The encoder will then forward the position signals of the motor to the driver, which processes them and accordingly moves the motor into position.

Instead of signal transfer via a line, however, wireless transmission may also be provided, which either forwards the signals for all motors of a slide to the individual slides, which means that a central receiver is located on each slide, or alternatively, each motor may have its own receiver or groups of motors may have their own receiver, via which it will then receive the control signals. Of course it is also expedient in this context to provide motors with an integrated driver, i.e. that the driver is directly coupled to the receiver or has an integrated receiver.

The invention can provide for a single circulation direction for the slides. This means there will be no reverse operation. In the prior art, there are manufacturing devices with lines having excessive lengths, which allow several rotations of the or each slide until the lines have been turned to a degree that can still be tolerated. Subsequently, the apparatus will be moved in the opposite direction of rotation. This reverse operation requires a greater complexity both in respect of the control and in respect of the mechanical preconditions.

DETAILED DESCRIPTION

The figures show a schematic view of an injection moulding apparatus having a guide block 10, along which a plurality of slides 12 can be shifted in a circulating manner.

Around the guide block 10, a plurality of injection moulding stations 14, 16 is provided. When the slides 12 are shifted around the guide block 10, they move past the injection moulding stations or through the stations. Laterally of the guide block 10, mould tool housings 20, 22 are provided on two lateral surfaces.

The guide block 10 is provided with one or more guides 26, the function of which is to attach the guides 12 to the guide block 10 so as to be traversable.

The guide 26 is in particular intended to ensure here that the slides 12 are guided in a precise manner and as tolerance free as possible.

The guide 26 may for example be embodied as a guide rail, on which the slides 12 are guided using rollers, roller bearings or similar elements.

Figure 1:
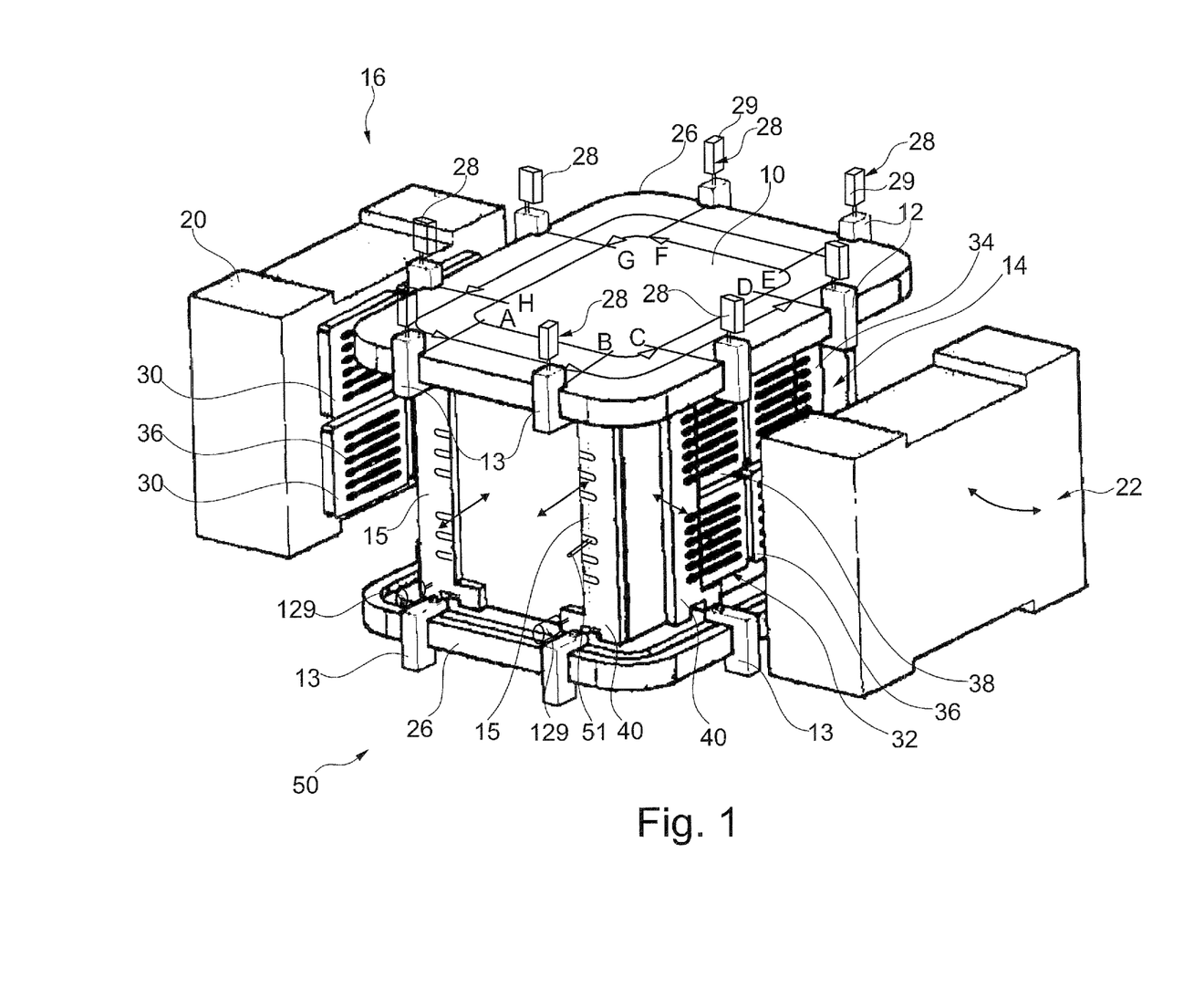
FIG. 1 shows a schematic top view of an injection moulding apparatus.

In the embodiment shown in FIG. 1, a slide 12 comprises two bearings 13 guided in guides 26, which are coupled to each other via a bridge 15.

In order to shift each slide 12, one driving device 28 (see FIG. 2, which only shows the top section of the guide block) each is provided, by means of which each slide can be separately and individually driven about the guide block 10. The only limitation of the individual traversability of the slides consists in the fact that no slide can overtake another. Otherwise, each slide can be moved individually and independently from the other slides with regard to travel route and traversing speed.

Figure 2:
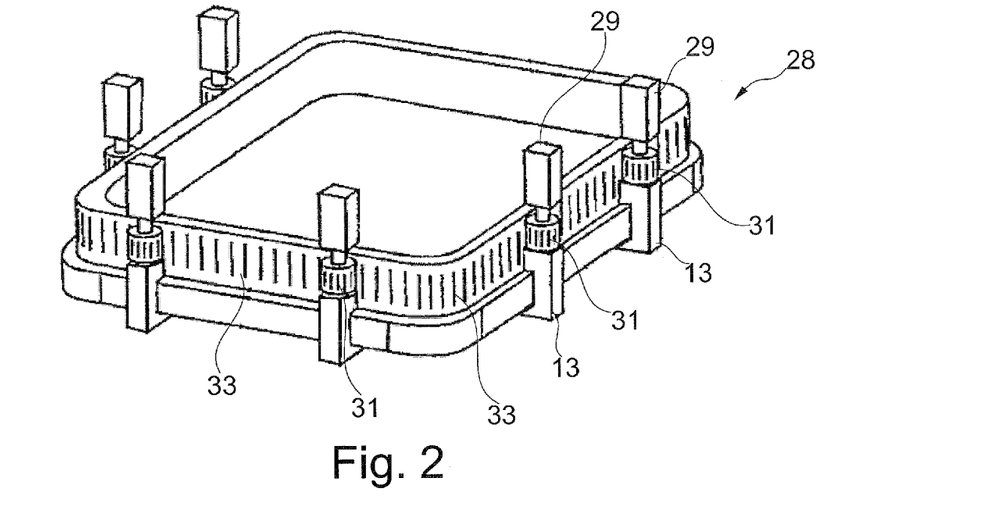
FIG. 2 shows the top end of the apparatus of FIG. 1.

For example, the driving device 28 may be formed by a drive motor 29 on each slide 12, which is coupled to a driving element, for example a drive wheel or a gear 31, which in turn interacts with the corresponding counter element of the central guide block 10, for example a running track or a toothed rack 33 (FIG. 2).

The driving device 28 may also be implemented as a linear motor associated with the slide, which shifts the latter relative to the guide block 10 in a contactless manner. The driving device 28 may also be implemented by a plurality of belt drives, by means of which the slides may be individually shifted. It is possible here to provide fewer belt drives than there are slides, by way of a suitable allocation of the belt drives to the injection moulding stations, because it is sufficient for a minimised cycle time to shift the slides merely in the area of some injection moulding stations individually and independently from each other, for example in the area of the injection station, whereas the slide may be shifted synchronously (and thus by means of the same belt drive) by an unloading or a loading station, without this having a negative influence on the cycle time.

The drive devices mentioned are merely examples and do not constitute a final listing.

Each slide 12 has preferably attached thereto at least one section of a mould block (which also includes a core) for injection moulding a part or all of the brush body 32. In the embodiment example shown, a plurality of mould blocks 30, 32 is attached for each injection moulding station to the mould tool housings 20, 22 and the guide block 10, which have sub-cavities that complement the cavities when the apparatus is closed.

The tool housing is provided with injection nozzles.

The mould tool housing 20 is positioned to be stationary, whereas the mould tool housing 22 as well as the guide block 10 can be driven translationally and can linearly slide in the direction of the arrow near the reference numeral 22. FIG. 1 shows the open position of the apparatus. In order to close the apparatus, the mould tool housing 22 as well as the guide block 10 are driven in the direction of the mould tool housing 22, until the mould blocks 30, 32 contact each other on the mould tool housings 20, 22 and the guide block 10, in order to close the cavities. The mould blocks 30, 32 may be implemented as interchangeable parts. As mentioned, they each have open sub-cavities 36, here different sub-cavities 36 that are positioned next to each other, for brush bodies of toothbrushes.

When the apparatus is closed, liquid plastic can be injected into the closed cavities.

Part of the mould blocks 32, here in the area of the toothbrush heads, is formed by a type of elongate holder 40 that is seated on the bridge or forms the latter. The holder 40 forms a so-called head plate and includes sections of the sub-cavities 36 in the mould block 32 and thus forms a movable section of the mould block 32.

The or each section 38 of the mould blocks 32, which is on the guide block 10, has an elongate recess in the head area, into which the holders 40 may be introduced in order to complete the sub-cavities 36 on the guide block 10.

The holders 40 may be movable by their own motors 129 radially to the guides outwards relative to the bearings 13 (see arrows in FIG. 1). In order to allow a lateral or radial traversing of the holders 40 into the recess on the mould block section 38 located on the guide block 10, they may be provided with their own motors 129, and at least one own motor that is responsible for the feeding movement, is moved on the slide 12.

As an alternative to the lateral movement of the holders relative to the guide block 10, the mould block sections 38 located on the guide block 10 may also be supported on the guide block 10 so as to be laterally traversable, so that the holders 40 are rigidly seated on the respective slide 12.

The variant having laterally traversable holders 40 will be explained below.

The two slides with their holders 40 have just moved into the right-hand station 14. The station 14 has two mould blocks 32 which lie next to each other, so that two rows of sub-cavities are formed here. The holders have already moved into the recesses of the mould block sections 38, so that the mould block 32 is complete.

After closing by the mould blocks 30 on the mould tool housing 22, a first component is injected into the cavities.

After cooling, the apparatus is moved apart. After that, the motors 129 move the holders 40 also outwards and in the course of this push the injection-moulded brush bodies out of the sub-cavities in the mould block 32.

The brush bodies are moved with the slides further into the station 16, where they can be positioned in other sub-cavities. Here, too, the respective holder complements the mould block sections 38 provided with sub-cavities (not shown). In some places, the cavity is not filled with the inserted brush body, so that a space for injecting a further component is present.

After injecting this component, the holder 40 will move the finished brush body to an ejection station 50, where the brush bodies are removed from the holder 40.

The slides 12 run irreversibly in one direction about the guide block.

Of course, further stations may also be provided. These may include a filling station, if e.g. platelets already stuffed with bristles are inserted into the holders 40, which are subsequently overmoulded under formation of the brush body. Further, the holder may also be provided with cores 51, which generate e.g. spaces in the article to be produced or which become part of the article.

The motors 29 and, if present, 129 are electric motors, e.g. servomotors.

In order to shift the slides 12 along the guide 26 and the holders 40 on the slides 12, a controller 48 which is schematically shown here (see FIG. 3) is provided, which can be freely programmed as desired.

The controller 48 controls, as a function of the desired processing steps, at what rate and with what steps the slides 12 are shifted along the guide 26, as well as when and how quickly the holders are moved laterally.

It is also possible to "double-equip" the injection moulding apparatus, i.e. a loading station, various injection moulding stations and an unloading station in one half, and subsequently again a loading station, a plurality of injection moulding stations and an unloading station in the second half. In this way, the number of brushes produced per cycle can be doubled.

It is not necessary to pre-position the brush base body in front of each injection moulding station, however it would be possible.

It can be seen that not all the slides always have to be moved at the same time. An individual shifting of the slides is necessary where this is advantageous for optimising the cycle times and with a view to pre-positioning. It is also possible to shift the slides 12 located in station 14 or 16 synchronously at the same time.

Since the shifting movements in one station do not have to be carried out at the same time as those in a subsequent bristle-stuffing station, but are independent and decoupled from each other, the manufacturing process can be optimised. An individual modification of the movement processes can be made possible without a standstill of the apparatus, i.e. without manual modification, e.g. in order to take into account cycle times, to add stations, etc.

Some or all of the motors 29, 129 may be implemented as DC or AC servomotors, in particular as AC servomotors.

At least one electrical power supply line 84 and at least one signal line 86 lead to each servomotor 29. Electrical power supply is carried out via a central electrical power source 70 and signal supply is carried out via the controller 48. At the centre of the loop-shaped guide 26, which means at the centre of the guide block 10, a stationary, central contact point 72 is provided. This contact point 72 comprises a type of circular cylindrical column with just a few sliding contacts, via which the current flow and the signal flow to the individual motors 29, 129 occurs.

Figure 4:
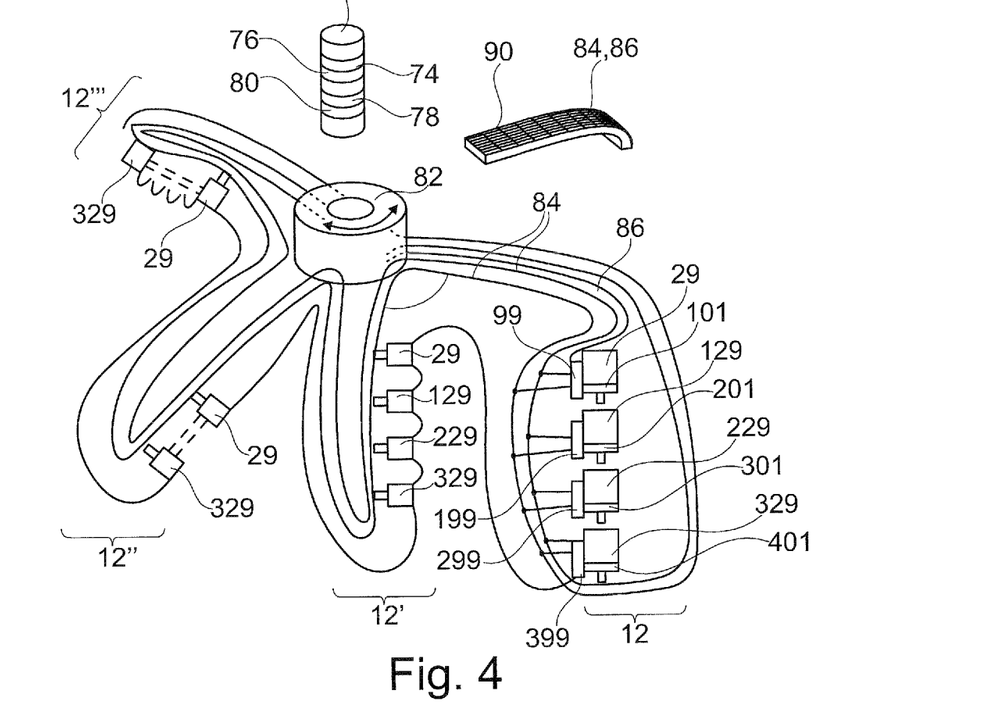
FIG. 4 shows a schematic view of the circuits of the motors of the injection moulding apparatus according to the invention.

In order to simplify the explanation, FIG. 4 shows the individual slides respectively identified with 12, 12', 12", 12'". In order to generalise. FIG. 4 shows four motors 29 to 329 provided on each slide 12, 12', 12", 12'" etc., each of which cause different movements. It is of course also possible to provide just one or two motors per slide 12. The description following below is therefore exemplary of the electrical power and/or signal supply to one or several motors on the slides 12.

Here, a set of sliding contacts 74, 76 is provided for electrical power supply and a set of sliding contacts 78, 80 is provided for signal supply (see FIG. 4). Each set of sliding contacts has at least two movable contacts which are attached for example on a rotating slip ring 82, and corresponding stationary contacts which are provided on the column 72 and are permanently connected to the electrical power source 70 and the controller 48.

The sliding contacts 74, 76 are in connection with the wires of the electrical power supply line 84, which has a first section that leads to a motor 29 of a slide 12.

The at least two-wired electrical power supply line 84 (in the case of AC motors there are even more wires) forms a ring line with which the motors are coupled.

Optionally, this is not to be understood in a limiting sense, the electrical power supply line can extend from the motor 29 to the motor 129 (if present) and (if present) subsequently to the motor 229 and then (if present) to the motor 329 of the slide 12, an that all the motors of the slide 12 are coupled to the electrical power supply line 84.

As an alternative, it would also be possible to provide the motor 29 with its own electrical power supply line 84 and to have a common electrical power supply line for the lines 129, 229, 329 or to couple only the motors 129 or the motors 229 or the motors 329 to a common line.

However, there are also motors that are or have to be controlled via more than two electrical power lines and more than two signal lines. To this end, each will have provided one set of sliding contacts for electrical power supply and one set of sliding contacts for signal supply. In this case, the lines necessary for the electrical power supply and the signal supply of a motor will then also be used for the electrical power supply and the signal supply of some or all of the motors, so that no extra lines and above all no extra sliding contacts for other motors are necessary. However, also multi-wired cables, e.g. hybrid cables, may be used, so that a number of lines are combined in a cable.

In the embodiment shown in FIG. 3, the signal line 86 is implemented in such a way that it extends from the associated sliding contact to the first motor 29 on the slide 12 and subsequently on this slide to the second motor 129 etc. and from slide 12 back to the centre and then directly to the motors 29, 129, 229, 329 of the second slide 12' etc., until it is finally coupled again to the stationary part of the contact point via a sliding contact 80. A series connection of the motors is possible for the signal line connection, but this is not absolutely necessary. What is also shown for the signal line 86 is a type of ring line for the signal supply, to which again the individual motors 29 etc. of the slides are coupled.

Independently from this, the electrical power supply line 84 and the signal line 86 do not extend back to the sliding contacts after the slide 12, but merely to the centre of the guide block 10, so as to extend then directly to the motors 29, 129, 229, 329 of the adjacent slide 12', and from there to the motors of the again adjacent slide 12" etc. This means that all the motors within a slide and all the motors of all the slides are connected to the same line 84 or 86, both in relation to the electrical power supply and to the signal supply.

However, it would also be possible to couple the drive motors of the slides 12, 12' etc. to one line and the motors 129 to 329 of all slides separately to a separate line with their own sliding contacts, again both in respect of electrical power supply and in respect of signal supply.

Furthermore, it would be possible to provide wherein one or more lines are guided directly from the only motor of a slide to the only motor of another slide, also without providing a sliding contact therebetween.

From the last slide 12'", the electrical power supply and signal lines then extend to the associated sliding contacts 76 and 80, respectively, back to the column.

This results in a type of star-shaped construction, if viewed in the direction of the axis of the ring 82, of the electrical power supply lines 84 and the signal lines 86.

The signal line is normally implemented to be multi-wired.

The controller 48 is implemented with a bus system, so that specific control data sets are output on the same line for the individual motors 29, 129, 229, 329, which control data sets will be recognised by the motors as being associated with them.

All the slides, 12, 12' etc. are arranged so that they can be shifted relative to the injection moulding stations in a freely programmable manner independently from each other, which results in the distances between adjacent slides being variable. However, this hardly puts any strain on the corresponding lines 84, 86, only the angle α (see FIG. 3) between the lines 84, 86 of adjacent slides changes, which are guided as packets.

The distance between the stationary contact points, i.e. the centre of the guide block 10 and the individual slides, is variable during a circulation of the slide, because the guide 26 does not extend in a circular manner, but forms here a substantially rectangular path with rounded corners.

Figure 3:
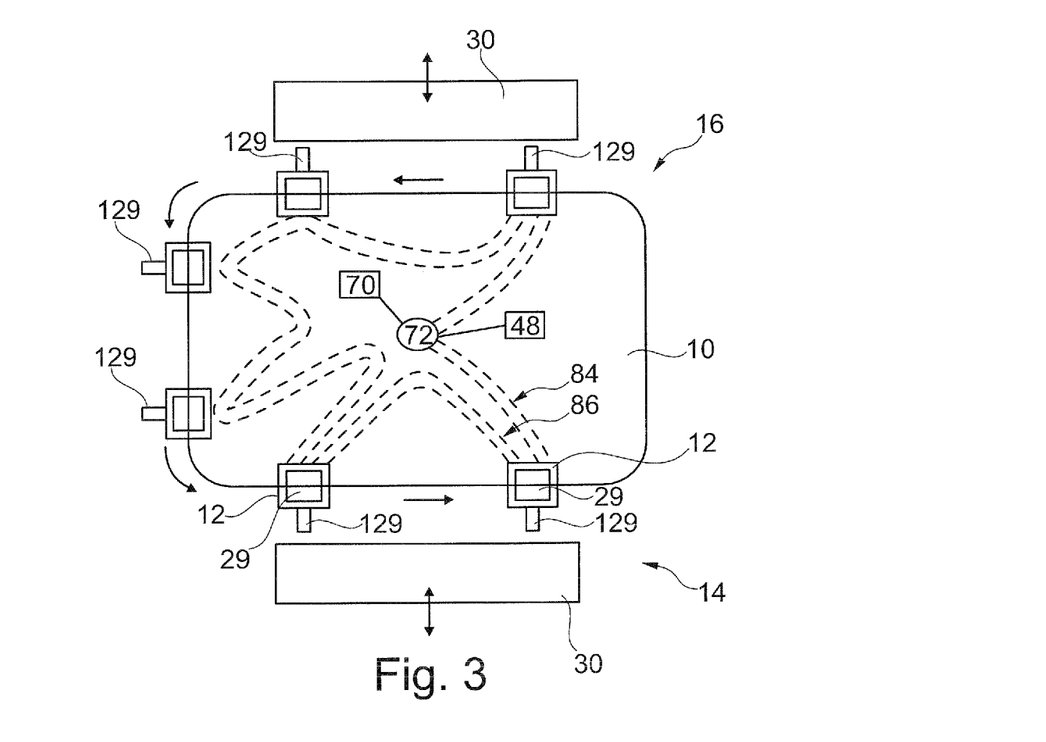
FIG. 3 shows a schematic top view of the injection moulding device according to FIG. 1.

For a stable guiding of the lines 84, 86 from the centre to the slides, the line sections are each guided from the centre to the individual slides in cable carrier chains 90, as is schematically shown in FIG. 3. These cable carrier chains 90 compensate the longitudinal displacement by a type of roll-off movement of the chain, as a result of which kinking of the lines 84, 86 is avoided. These cable carrier chains 90 are fastened at one end to the ring 82 and at the other end to the guides.

Whilst in the prior art a separate sliding contact set was provided for each motor, the invention is directed towards ensuring that several motors are supplied, in respect of electrical power supply and/or signal supply, with electrical power and signals by the same set of sliding contacts.

As has already been mentioned above, the motors may be servomotors, in particular with an integrated controller 99, 199, 299 or 399. Moreover, the motors are provided with their own encoders 101, 201, 301, 401, which forward the position of the motor shafts to the associated controller.

Thus, the signal lines 86 extend to the controllers 99, 199, 299, 399 of the individual motors, which then control the respective electric motor in a path-controlled manner, by receiving the position feedback from the encoder 101, 201, 301, 401. However, the superordinate control is still carried out via the central controller 48.

Figure 5:
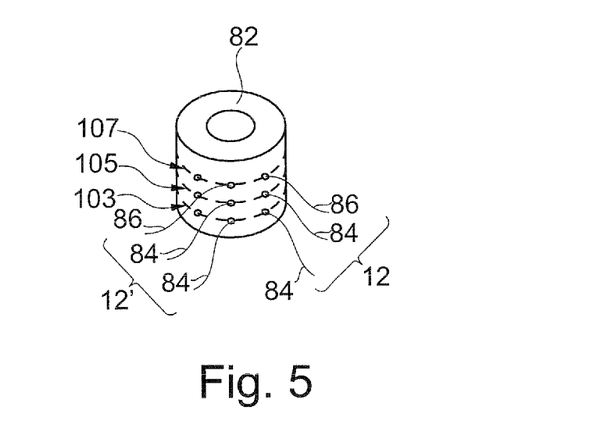
FIG. 5 shows a ring contact for another embodiment of the invention.

FIG. 5 shows a slightly changed variant compared to FIG. 4, wherein parts having the same function are identified with the same reference numerals, and only the differences are addressed. In this embodiment, the slip ring or a moved part has integrated in itself, as it were, already integrated moved ring lines 103, 104, 105, 106, 107, each of which have associated therewith sliding contacts.

These ring lines are part of the electrical power supply lines 84 and of the signal lines 86. Thus, for example, the signal line 86 that leads to the motors on the slide 12, which can also be implemented in a multi-wired form, are connected to the ring 82 via a plug-in contact.

The corresponding line section 86 to the motors of the slide 12' will then also be directly coupled to the ring line 107. From a circuit engineering point of view, this results in a line extension where a line section 86 to a motor is returned back to the ring line 107 via a wire and is then coupled to the other line section 86 via the ring line 107 which then leads to the motors of the slide 12'.

This, too, results in a considerably reduced number of sliding contacts compared to the prior art. Here, too, several motors share the same set of sliding contacts.

In all embodiments shown the lines for electrical power supply and/or the at least one line for signalling are guided from one slide to another without sliding contacts therebetween and motors of these slides are coupled with at least one line moved therewith for transfer of electrical power and/or signals.

If an open bus system is used, a single signal line 86 may be used, which then terminates on the last motor 329 of the slide 12''', without going back to the contact point. If the control requires more than one signal line 86, then these signal lines 86 will terminate on the last motor 329 of the slide 12'''.

The connection of the drive motors as presently described is also applicable to the embodiment following below, as shown on the left-hand side in FIG. 6. Here, only one motor 29 to 329 is provided on each slide 12 to 12''', but these are connected in the same way as the motors 29 of the slides 12 to 12''' in FIG. 4.

Figure 6:
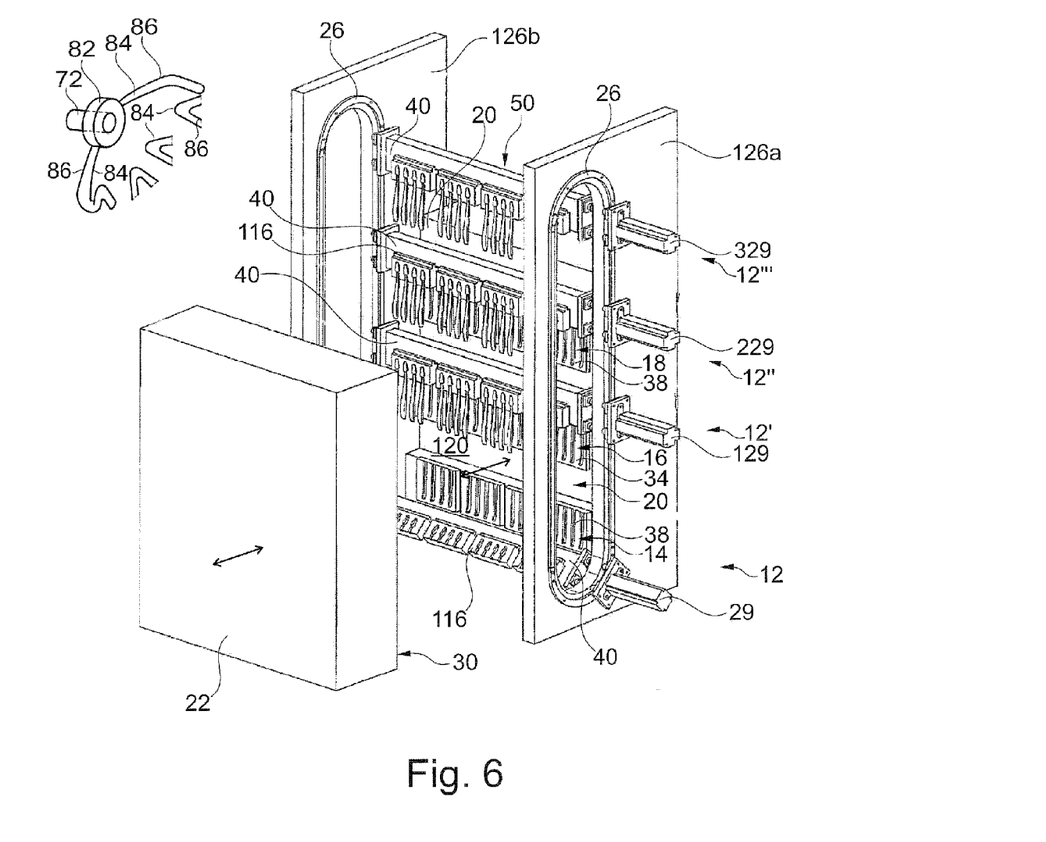
FIG. 6 shows a further embodiment injection moulding apparatus according to the present invention.

The view onto the open injection moulding apparatus in FIG. 6 shows a mould block 32 that is stationary on the nozzle side and a mould block 30 that is movable on the ejection side. FIG. 6 is a type of exploded view, because the mould block 32 is actually located offset to the right directly into close vicinity of the mould block 30.

The embodiment shown is an injection moulding apparatus for the three-component injection moulding of toothbrush bodies. This is merely an example, which also applies to the above first embodiments. It is possible to injection-mould a variety of articles from more or less than three components, e.g. writing utensils, medical articles, razor blade holders and the like.

On the inside, the mould tool housings 20, 22 carry mould blocks 30 and 32 for example with three groups of sub-cavities which are arranged vertically above each other and which form, when the injection moulding apparatus is closed, three groups of cavities which in each group are located parallel next to each other, wherein in the example shown, the longitudinal direction of the cavities is vertical in the space.

Each group of cavities forms an injection station for injection moulding one of the three components.

Outside of the housing 20, 22 and directly below or, as shown, above the top injection station, there is an ejection station 50 where finish-moulded articles are ejected with the injection moulding apparatus closed.

The mould plates of the movable mould block 32 are divided; a bottom section 38 of the sub-cavities is fixedly attached to the housing 20, and a top area is formed in a mould insert 116 that is carried by a holder 40.

The mould insert 116 fits into a recess in the section 38.

The holder 40, for example in the form of an elongate plate or rail, extends transversely over the group of cavities and can, but does not need to be coupled at each of its outer ends detachably to a drive system that moves the holder between the injection stations and the ejection station.

The mould blocks 30, 32 may be assembled from individual parts or may be integrally formed, and the cavities and sub-cavities or the division of the cavities into sections are determined by the articles to be produced.

The drive system of the injection moulding apparatus comprises individual motors, in particular servomotors 29 to 329, which provide for the onward movement of the holders 40 with their mould inserts 116.

In the embodiment shown, which is not to be understood in a limiting sense, one servomotor is provided per injection station and per slide 12 to 12''', and a further one is provided for the ejection station.

The servomotors 29 to 329 are freely programmable and extend along a closed travel path that is formed for example by guides 26 and 124b on two guide plates 126a and 126b which are vertically spaced apart from each other. However, this example for the guides is not to be understood in a limiting sense.

Each of the servo-drives can be coupled to the holder 40 either in a detachable or in a permanent manner.

In FIG. 6, the servomotor 29 has been attached to one of the holders 40 and moves the latter towards the recess 120 of the bottom injection station 14, in order to insert it there together with the mould insert 116. At the same time, the servomotor 129 has moved one of the holders 40 to the next station in order to place it there, and at the same time, the servo-drive 229 has moved one of the holders 40 from the central injection station 16 onwards into the top injection station 18, whilst the servo-drive 329 has moved one of the holders 40 from the top injection station 18 to the ejection station 50.

Together with each holder 40, at least one corresponding mould insert 16 is moved, from which parts to be moulded are suspended. In the embodiment shown, the parts to be moulded are elongate, because toothbrush bodies are injection-moulded which are seated with their head area in the sub-cavities of the mould inserts 116 and are vertically suspended therefrom.

The drive system with its servomotors is freely programmable, in order to move the holders 40 with the mould inserts 116 between the injection stations 14-18 and the ejection station 50, so that the parts to be moulded in the bottom injection station 14, which had the first component injected onto them, are moved into the central injection station 16, whilst the parts to be moulded in the central injection station 16, which had the first and second components injected onto them, are moved into the top injection station 18, in order to inject there the third component, and in order to finally transport the finish-moulded parts from the top injection station 18 to the ejection station 100.

When the holders 40 with their mould inserts 116 have been indexed forward, the mould block 30 that had been moved backwards (see arrows in FIG. 1) prior to the indexing moves back to the front again and to the level of the mould inserts 116 and adjacent thereto. Alternatively, the mould tool housing 20 may be stationary and the mould tool housing 22 and the holders 40 are moved towards and away from the housing 20. After the injection process, the apparatus will move back up again and the moulded parts are moved out of the mould blocks 30, 32, however, they remain stuck in the cavities of the mould inserts 116 of the holders 40. Subsequently, they are indexed forward.

Further details regarding the injection moulding process in the embodiment according to FIG. 6 are disclosed in WO 2012/130469 A, which is included therein in its entirety.

In FIG. 6, no reverse operation is provided either. The motors 29 to 329 share a slip ring set.

The options regarding the lines 84, 86 and the slip rings, which were explained in connection with FIGS. 1 to 5, can be realised also in FIG. 6.

The invention claimed is:

1. An injection moulding apparatus for injection moulding articles from plastic, comprising a guide that extends along a plurality of stations, including at least one injection moulding station, and along said guide at least one slide can be driven successively through the stations, wherein each slide transports the article to be produced from station to station, wherein the slide or the plurality of slides altogether have associated therewith a plurality of motors which are seated on the slide or the slides, wherein
said motors have associated and moved therewith at least one of lines for supplying electrical power and at least one line for signalling, which are coupled with a stationary electrical power source or a stationary controller, respectively,
at least one of the lines is guided from one motor to another, and
said motors are coupled with said at least one line in respect of the transfer of electrical power and signals, respectively,
wherein each slide comprises at least one section of a mould block, and wherein each slide has at least one motor for moving the at least one section of a mould block.

2. The injection moulding apparatus as claimed in claim 1, wherein at least one of the at least one line for signalling and the lines for electrical power supply are guided from one slide to another without sliding contacts therebetween, and motors of these slides are coupled with at least one line moved therewith for transfer of electrical power and/or signals, respectively.

3. The injection moulding apparatus as claimed in claim 1, wherein at least one motor is seated on a plurality of slides and wherein at least one of the at least one line for signalling and the lines for electrical power supply are directly guided from one slide to another and motors of these slides are coupled with at least one line moved therewith for transfer electrical power and signals, respectively.

4. The injection moulding apparatus as claimed in claim 1, wherein a plurality of slides is provided and motors of all of said slides are coupled with the at least one of said lines moved therewith for transfer of electrical power and signals.

5. The injection moulding apparatus as claimed in claim 1, wherein all of the motors of all the slides are coupled with the at least one line moved therewith for transfer of electrical power and signals.

6. The injection moulding apparatus as claimed in claim 1, wherein one motor each for moving said slide along said guide is attached to said slide.

7. The injection moulding apparatus as claimed in claim 1, wherein the or each slide has at least one motor for shifting the section of the mould block relative to the slide.

8. The injection moulding apparatus as claimed in claim 1, wherein said guide extends in a closed loop.

9. The injection moulding apparatus as claimed in claim 8, wherein said guide extends about a stationary guide block.

10. The injection moulding apparatus as claimed in claim 1, wherein the lines moved therewith start from a stationary, central contact point.

11. The injection moulding apparatus as claimed in claim 10, wherein the contact point has sliding contacts for changing a stationary contact to a moving contact.

12. The injection moulding apparatus as claimed in claim 11, wherein only one set of sliding contacts for the lines moved therewith for electrical power supply and one set of sliding contacts for the at least one moved line for signalling are provided.

13. The injection moulding apparatus as claimed in claim 10, wherein said guide extends in a closed loop and wherein the stationary contact point is provided in the centre of said loop-shaped guide.

14. The injection moulding apparatus as claimed in claim 10, wherein said lines for electrical power supply and said at least one line for signalling extend in a star-shaped manner from the end to the centre of the loop-shaped guide.

15. The injection moulding apparatus as claimed in claim 14, wherein at least one of said lines extending to the slides starts from one slide first to the centre and from there to the subsequent slide.

16. The injection moulding apparatus as claimed in claim 1, wherein said guide is arranged in a closed loop and deviates from a circular shape.

17. The injection moulding apparatus as claimed in claim 1, wherein all of the motors are freely programmable independently of each other.

18. The injection moulding apparatus as claimed in claim 1, wherein the controller has one of an open and a closed bus system, which controller is formed in such a way that it outputs specific control data sets for the individual motors.

19. The injection moulding apparatus as claimed in claim 1, wherein at least some of the motors are servomotors having an integrated controller.

20. The injection moulding apparatus as claimed in claim 1, wherein on at least some slides each at least one holder is seated that can be driven and that carries sections of sub-cavities of a mould block, which complements sections of the sub-cavities of said mould block, wherein the holder transports completely or partially injection-moulded articles from one station into a subsequent station.

21. The injection moulding apparatus as claimed in claim 1, wherein all of the motors of all the slides are coupled with the at least one line moved therewith for transfer of electrical power or signals.

22. The injection moulding apparatus as claimed in claim 10, wherein aid lines for electrical power supply or said at least one line for signalling, extend in a star-shaped manner from the end to the centre of the loop-shaped guide.

* * * * *